United States Patent [19]

Chern et al.

[11] Patent Number: 4,609,179

[45] Date of Patent: Sep. 2, 1986

[54] SCREW JACK

[76] Inventors: Shinn I. Chern, No. 1, Lane 624, Sha Tien Road, Sec. 3; Yih K. Jwo, No. 825, Sha Tien Road, Sec. 3, both of Ta-Du Hsiung, Taichung Hsien, Taiwan

[21] Appl. No.: 737,105

[22] Filed: May 23, 1985

[30] Foreign Application Priority Data

Apr. 19, 1985 [TW] Taiwan ................... 6923888

[51] Int. Cl.⁴ ............................... B66F 3/10
[52] U.S. Cl. .................................. 254/102
[58] Field of Search ............ 254/102, DIG. 2

[56] References Cited

U.S. PATENT DOCUMENTS

| 1,414,683 | 5/1922 | Anglada | 254/DIG. 2 |
| 2,857,226 | 10/1958 | Schenk | 254/DIG. 2 |
| 3,149,822 | 9/1964 | Hadek | 254/102 |

Primary Examiner—Robert C. Watson
Attorney, Agent, or Firm—Cushman, Darby and Cushman

[57] ABSTRACT

A screw jack which comprises a motor mounted in a housing which also houses a vertically mounted lifting screw assembly, a transmission unit for transmitting the output motion of the motor to the lifting screw assembly, and a limit switch means which is actuated by the screw assembly. The limit switch means includes an upper limit switch and a lower limit switch provided where the upward movement and the downward movement of the screw assembly are intended to be ended.

5 Claims, 6 Drawing Figures

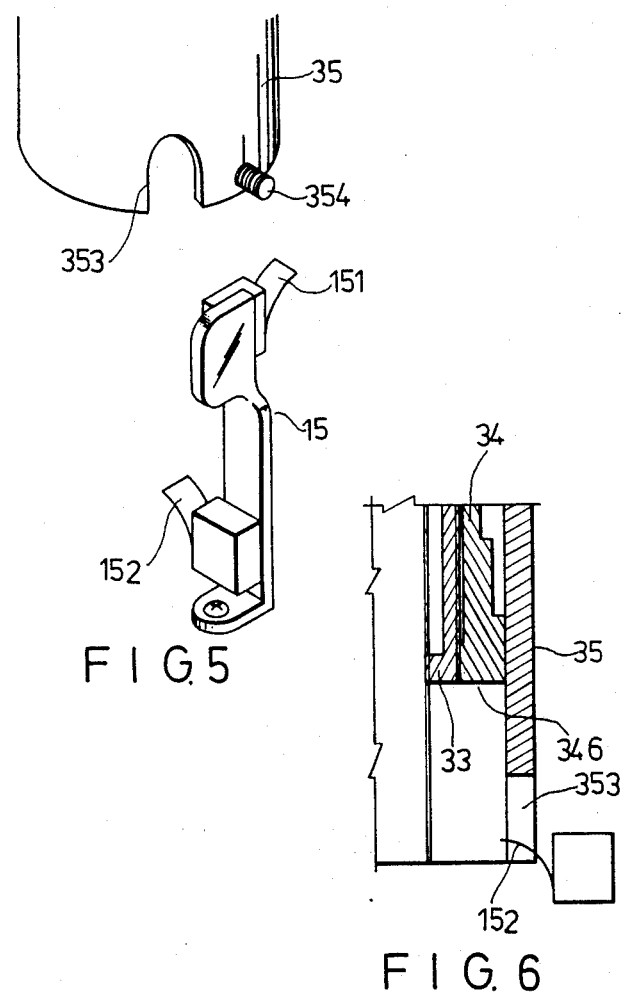

SCREW JACK

BACKGROUND OF THE INVENTION

This invention relates to a jack, and particularly to a motor operated jack. This is an improvement made over the conventional hand-operated hydraulic jacks and screw type jacks used in working on vehicles which are not safe.

SUMMARY OF THE INVENTION

An object of the invention is to provide an improved electrically operated screw-type jack which is safe and does not require that a person stand near the load to be lifted while operating it.

This and other objects can be achieved in accordance with the invention through the provision of a screw jack which comprises: a housing; a motor mounted in the housing; a lifting screw assembly vertically mounted in the housing and extendable outward from the housing; a transmission unit for transmitting the output motion of the motor to the lifting screw assembly; and a limit switch means actuated by the screw assembly provided at the end of the upward movement or the downward movement of the screw assembly.

The lifting screw assembly may include a vertical screw rod mounted for rotation in the housing and driven by the motor. The screw rod has a first screw thread on the periphery of the rod. There is further provided a first sleeve around the rod having a second screw thread on the inner surface thereof engaged with the first screw thread and a third screw thread on the outer surface thereof. Around the first sleeve is provided a second sleeve having a fourth screw thread on the inner surface thereof which is engaged with the third screw thread. A means for guiding the first sleeve and the second sleeve is movably mounted in the housing.

The second sleeve may further include a fifth screw thread provided at the outer surface thereof, wherein the screw assembly further includes a third sleeve sleeved on the second sleeve and having a sixth screw thread provided on the inner surface thereof and a bearing cap provided at the top of the third sleeve.

The guide means includes a fourth sleeve mounted in the housing in an axially movable position and provided around the third sleeve. The fourth sleeve is slideable relative to the second sleeve and the third sleeve and has an engaging portion for engaging with the second sleeve so that the fourth sleeve can move axially when the second sleeve is moved.

The present exemplary embodiments will be described in detail with reference to the accompanying drawings, in which:

BRIEF DESCRIPTION OF THE DRAWINGS

FIG. 5 is schematic view showing the limit switch of the jack; and

FIG. 6 is a fragmentary view showing the relationship between the limit switch and the screw assembly.

DETAILED DESCRIPTION OF THE PREFERRED EMBODIMENT

Figure 1:
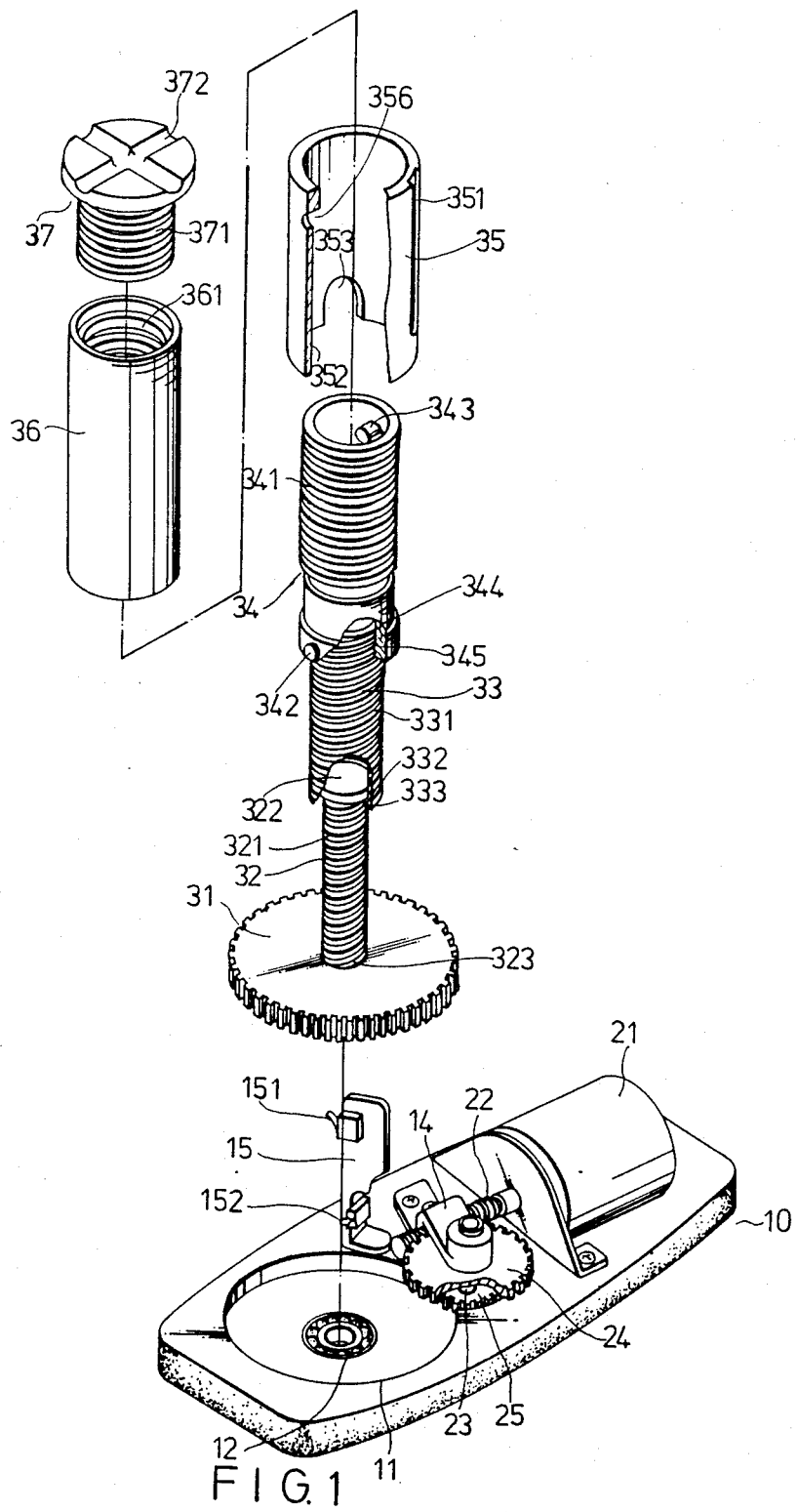
FIG. 1 is an exploded view of a lifting screw assembly according to the present invention.
Figure 2:
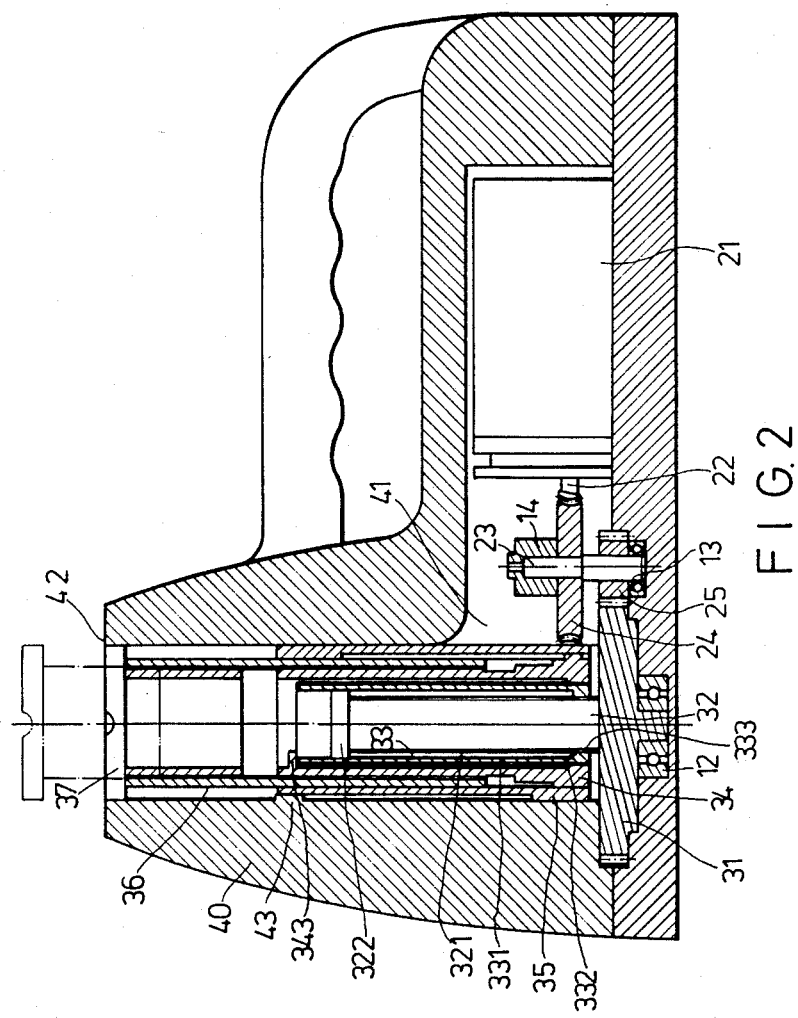
FIG. 2 is a sectioned view of a screw type jack embodying the present invention.
Figure 3:
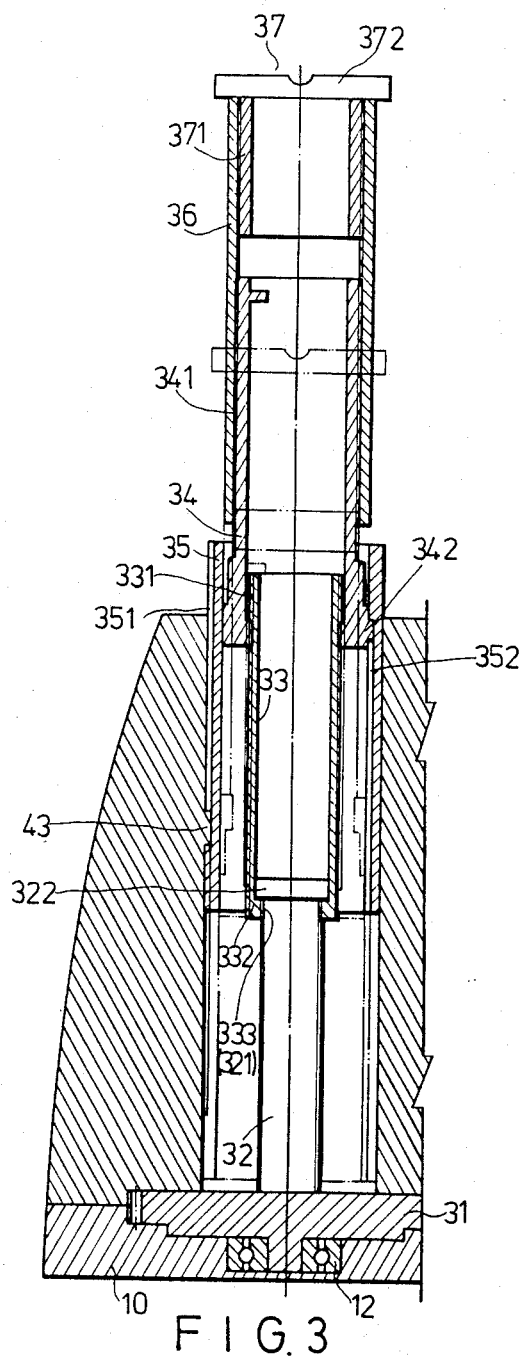
FIGS. 3 and 4 are fragmentary sectioned views showing the operating conditions of the jack.
Figure 4:
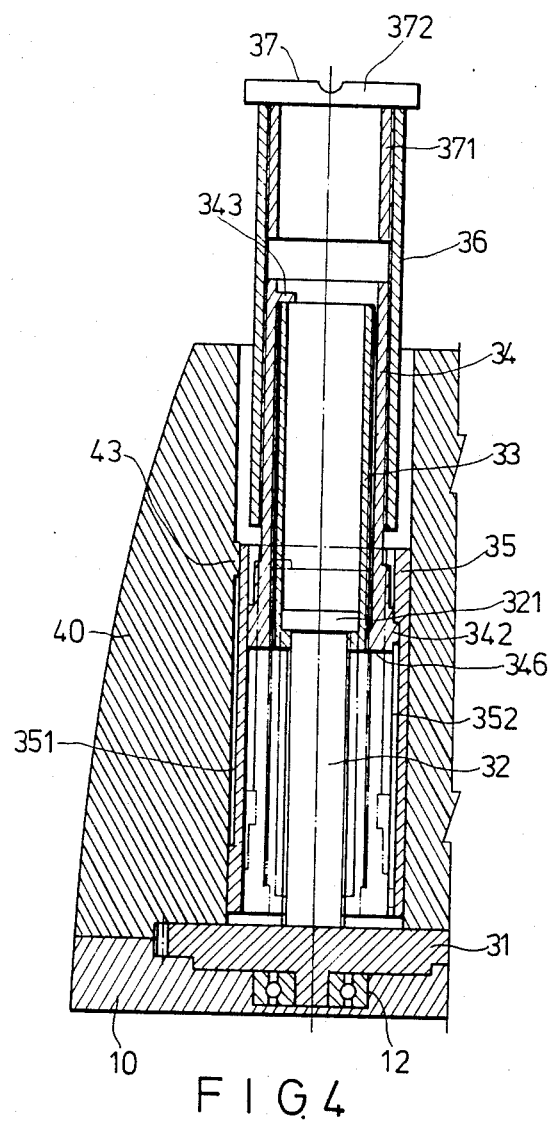

Referring to FIGS. 1 and 2, there is shown a screw type jack which includes a support base 10 on which are mounted a transmission means and a lifting assembly and a housing 40 superimposed on the base 10 for housing the transmission means and the lifting assembly.

The base 10 is provided with a circular recess 11 which has a deeper center portion receiving a bearing assembly 12 and a further recess receiving a further bearing assembly 13. A servo motor 21 is mounted on the base 10 and incorporates a driving worm 22 which drives a shaft 23 through a worm wheel 24. The shaft 23 is journalled in the bearing assembly 13 and carries a spur gear 25 which in turn is meshed with a gear 31.

The electric source for the motor 21 can be a direct current obtained from the vehicle and the switch is located outside the housing 40. There is further provided a support 15 on which is mounted an upper limit switch 151 and a lower limit switch 152. A retaining member 14 is further mounted on the base 10 for retaining the worm 22.

The lifting unit includes a screw rod 32 having a male thread 321 and an engaging flanged end 322 at its top side. The lower end 323 of the screw rod 32 is fixedly inserted in the spur gear 31 which is connected to the bearing assembly 12. There is further provided a first sleeve 33 which is provided with an external male thread 331, and an internal female thread 333 is provided on an inwardly projected annular flange 332. The sleeve 33 is sleeved on the rod 32 before its lower end is fixed to the spur gear 31, the female thread 333 being meshed with the external male thread 321.

There is further provided a second sleeve 34 which has an external male thread 341 extended downward from its top side to a predetermined axial length, a first protrusion 342 projected from the outer periphery of a flanged end 344 at its bottom side, and a second protrusion 343 projected from the inner side of the wall of the second sleeve 34. The inner side of the flanged end 344 is provided with a female thread 345 which is meshed with the male thread 331.

There is further provided a third sleeve 36 sleeved onto a portion of the sleeve 34 adjustment of the height of the jack by threadedly moving the sleeve 36 relative to the sleeve 34. This adjustment is done manually when the servo motor is not operating. The third sleeve 36 is provided with a female thread 361 which is engaged with the male thread 341.

Around the sleeve 36 is further provided a fourth sleeve 35. On the periphery of the sleeve 35 is provided an axial groove 351 and on the inner surface thereof is an axial groove 352 which is extended down to the bottom side of the sleeve 35. The axial groove 352 permits the protrusion 342 of the sleeve 34 to slide therein when the sleeve 35 is moved relative to the sleeve 34.

At the top of the sleeve 36 is provided a cap 37 which has a bearing top member 372 and a screw portion 371 threadedly fitted in the sleeve 36.

There is still further provided a housing 40 connected to the base 10 having a space 41 for receiving the abovementioned elements and an opening 42 at its top side. On the inner side of the wall of the housing 40 is provided a projection 43 extended into the axial groove 351 of the sleeve 35 so that the sleeve 35 is prevented from upward movement when the projection 43 is engaged with the lowest end of the groove 351.

When the jack is used to lift a load, the screw rod 32 is rotated by the motor through the worm 22, worm gear 24, spur gear 25 and spur gear 31. The rotation of the screw rod 32 causes the first sleeve 33 to rotate and move upward. When the inwardly projected annular flange 332 is engaged with the flanged end 322, the first sleeve 33 stops its upward movement, but still continues to rotate, causing the upward movement of the sleeve 34 relative to the sleeve 33. Since the protrusion 342 is engaged in the groove 352 of the sleeve 35 and the projection 43 of the housing wall is engaged in the groove 351 of the sleeve 35, the sleeve 34 is moved upward without rotational movement. When the protrusion 342 of the sleeve 34 is moved to engage with the top end 356 of the groove 352, it carries the sleeve 35 along with it until the protrusion 354 of the sleeve 35 touches the upper limit switch 151 which cuts off the motor's operation to stop the movement of the sleeve 34 (see FIG. 5). It can be appreciated that the sleeve 34 is extended outward from the housing 40 together with the sleeve 36. The sleeve 36 is used for the extension of the height of the sleeve 34.

When the sleeves 34 and 36 are to be lowered, the motor is turned on again to drive the screw rod 32 to rotate. At this time, the direction of the movement of the screw rod is reversed. The rotational movement of the screw rod 32 and the sleeve 33 will cause the sleeve 34 to descend until the protrusion 343 of the sleeve 34 engages with the top of the sleeve 33. While the sleeve 34 is descending, the descending protrusion 342 of the sleeve permits the sleeve 35 to move downward due to its weight. When the bottom end 346 of the sleeve 34 actuates the lower switch 52 that is extended in part through a notch 353 provided at the bottom side of the sleeve 35, as shown in FIG. 6, the operation is stopped.

With the invention is thus explained, it is apparent that various variations and modifications can be made without departing from the scope of the invention. It is therefore intended that the invention be limited as indicated in the appended claims.

We claim:
1. A screw jack comprising:
a base;
a housing disposed on said base;
a motor mounted on said base;
a vertical screw rod mounted rotatably in said housing and driven by said motor;
a first threaded sleeve sleeved engagingly on said screw rod;
a second threaded sleeve sleeved engagingly around said first threaded sleeve;
a guide sleeve mounted movably around said second threaded sleeve, and having an engaging portion to engage with said second threaded sleeve and a protrusion projecting radially from its periphery;
a bracket member mounted in said housing and having an upper limit switch and a lower limit switch mounted at the upper and lower portions thereof and operatively connected to said motor, said upper limit switch stopping said motor from the raising operation when it is actuated by said protrusion of said guide sleeve, said lower limit switch stopping said motor from the lowering operation when it is actuated by the bottom side of said second threaded sleeve.

2. A screw jack as claimed in claim 1, said screw jack further comprising a third threaded sleeve sleeved around said second sleeve and a bearing cap fitted threadedly to the top of said third threaded sleeve.

3. Screw jack as claimed in claim 1 wherein said vertical screw rod includes an engaging flanged head arranged to engage with an annular flange disposed on the lowermost inner surface of said first threaded sleeve when said first threaded sleeve is in its uppermost position.

4. Screw jack as claimed in claim 1 wherein said upper and lower limit switches are directly operated by contact with said protrusion projection from said guide sleeve.

5. A screw jack as claimed in claim 2, wherein said guide means comprises a fourth sleeve mounted in said housing in an axially movable position and provided around said third sleeve, said fourth sleeve slideable relative to said second sleeve and said third sleeve and having a engaging portion to be engaged with said second sleeve so that said fourth sleeve can move axially when said second sleeve is moved.

* * * * *